May 28, 1940.   F. G. FOLBERTH ET AL   2,202,311
WINDSHIELD WIPER ARM
Filed Oct. 29, 1938
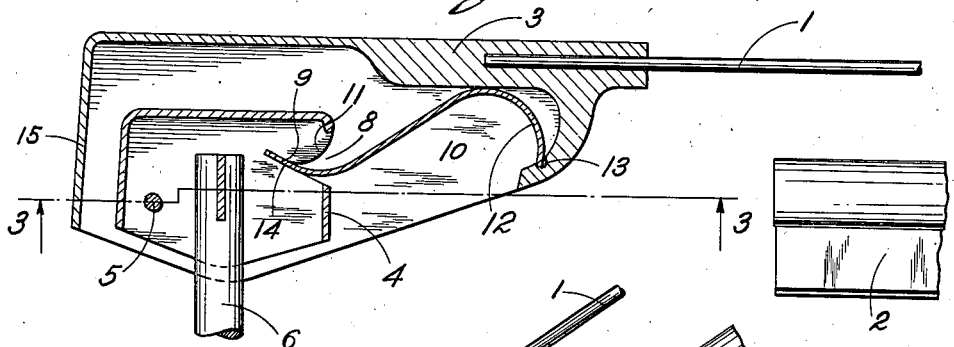
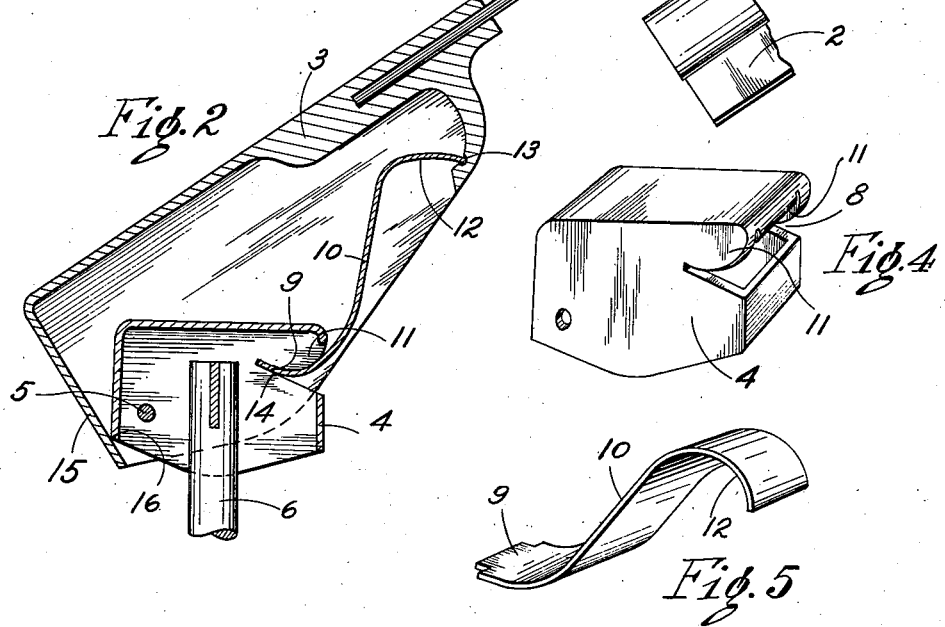
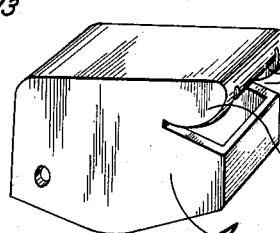
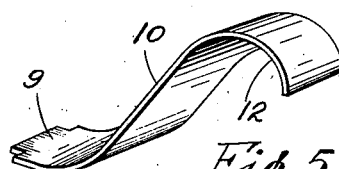
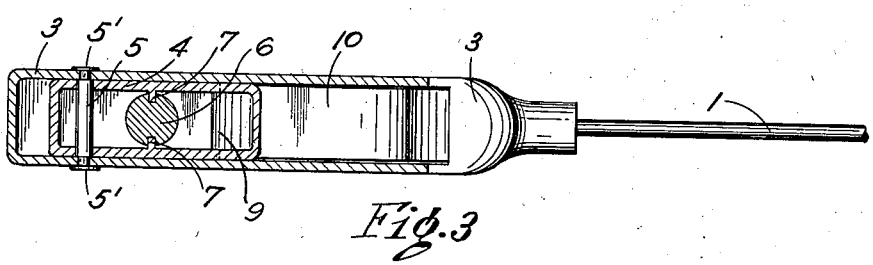
INVENTORS
FREDERICK G. FOLBERTH
& WILLIAM M. FOLBERTH
BY
Richey & Watts
ATTORNEYS Patented May 28, 1940

2,202,311

UNITED STATES PATENT OFFICE 2,202,311

WINDSHIELD WIPER ARM

Frederick G. Folberth and William M. Folberth, Cleveland, Ohio

Application October 29, 1938, Serial No. 237,730

2 Claims. (Cl. 15—255)

This invention relates to apparatus for removing rain, snow, sleet, etc., from glass surfaces such as automobile windshields and the like, and more particularly to an improved supporting mechanism for the rubber squeegee member which engages and cleans the glass.

The present application is a continuation in part of application Serial No. 24,624, filed June 3, 1935, now Patent No. 2,144,454.

In the usual type of automobile windshield cleaner the rubber squeegee is mounted in a metal backing and this metal backed rubber squeegee bar assembly is in turn detachably mounted on a supporting arm. A shaft, driven with an oscillating motion by any suitable means, carries the arm and swings it back and forth over the windshield.

It is among the objects of the present invention to provide a supporting arm assembly together with an improved connection between the arm and the operating shaft whereby necessary force may be exerted against the arm to cause the squeegee properly to engage the glass and whereby, when it is desired to wash the glass or change the squeegee member, the supporting arm can be moved away from the glass and will maintain its position with the squeegee out of engagement with the glass. Another object of our invention is the provision of an improved supporting arm construction for windshield cleaners which is simple in design, has a minimum of parts, is trouble free in operation and may be economically manufactured.

The above and other objects of our invention will appear from a description of a preferred embodiment thereof, reference being had to the accompanying drawing, in which—

Figure 1 is an enlarged cross-sectional view illustrating the wiper operating shaft with the supporting arm and its associated parts connected thereto, the supporting arm and squeegee being in windshield engaging position.

Figure 2 is a view similar to Figure 1 but illustrating the supporting arm in disengaged position whereby the squeegee blade is maintained well away from the glass.

Figure 3 is a cross-sectional view taken on line 3—3 of Figure 1.

Figure 4 is a detached perspective view of the shaft end cap member.

Figure 5 is a detached perspective view of the compression spring shown in the form it assumes when the parts are in the position shown in Figure 1.

The supporting arm 1 is adapted to carry the rubber squeegee bar 2 by any suitable connection (not shown). The inner end of the arm 1 is fixed in a supporting bracket 3 which fits over and is pivotally supported on the spring supporting member or shaft end cap 4. As is seen in Figure 3, a pivot pin 5 extends through suitable holes in the end cap 4 and the bracket 3 and may be riveted over at its ends, as indicated at 5'. Both the bracket 3 and the end cap 4 are preferably made in box section, open along one side, and it will be observed that the entire assembly is substantially completely enclosed thus eliminating undesirable projections. The shaft end cap 4 is secured to and rotates with the oscillating shaft 6. Inwardly projecting flanges 7 on the inner walls of the end cap engage grooves in the shaft 6 to form the driving connection or any other suitable connecting means may be employed. Slots 8 are cut in the opposite sides of the end cap 4 and the end 9 of the spring 10 abuts against the bottom of the slots 8. The opposite end 12 of the spring 10 is disposed in a groove or slot 13 in the bracket 3. The slots 8 have curved sides 11 which engage the edges of the spring 10 when the arm 1 is in retracted position (see Fig. 2). These curved portions 11 assist in causing the proper spring action to occur whereby the compression spring 10 forces the arm 1 toward the windshield in one position (Fig. 1) and away from the windshield in another position (Fig. 2). The effective point of support of the spring 10 on the end cap 4 is approximately at the point 14 and it will be seen from Figure 1 that a line drawn from the pivot point 5 of the bracket 3 to the groove 13, where the spring 10 exerts its pressure against the bracket 3 will pass inside of the point 14. As the spring 10 is a compression spring, tending at all times to exert a pressure against the slot 13 in a direction away from the shaft 6, its force will tend to move the bracket 3 and the arm 1 in clockwise direction about the pivot 5 thus causing the squeegee 2 to engage the glass to be cleaned.

When it is desired to wipe off the windshield glass with a cloth it is helpful completely to remove the squeegee 2 and the arm 1 from their operating position. To do this it is only necessary to lift the arm 1 and the bracket 3 away from the glass, the bracket 3 swinging on its pivot 5. When the assembly has been moved to a point where a straight line drawn from the pivot 5 to the groove 13 lies on the outside of the point 14 the compressive force of the end portion 12 of the spring 10 will tend to move the bracket 3 and the arm 1 in counter-clockwise direction and thus the parts will be held in the position shown in Figure 2. The outward movement of the bracket 3 is limited by the engagement of the end wall 15 with the corner 16 of the end cap 4 (see Fig. 2). This snap-over spring action makes it unnecessary to hold the arm 1 away from the windshield while cleaning it off with a cloth. To cause the squeegee to again contact the glass it is only necessary to push the arm 1 and bracket 3 towards the glass until the snap-over action takes place and the spring 10 causes the squeegee to engage the windshield.

Although we have illustrated a flat leaf spring member 10 for providing the compressive force between the shaft end cap 4 and the arm bracket 3 it will be understood by those skilled in the art that other types of springs, for example a coil spring under compression, may be used.

Although we have described the illustrated embodiment of our invention in considerable detail it will be understood by those skilled in the art that numerous modifications may be made without departing from the spirit of our invention. We do not, therefore, wish to be limited to the particular devices herein shown and described but claim as our invention all forms thereof coming within the scope of the appended claims.

We claim:

1. In a windshield cleaner or the like, a rotatable shaft having a spring supporting member secured to the end thereof, a wiper arm supporting member pivotally secured to said spring supporting member whereby said wiper arm supporting member will rotate with said shaft but may have movement relative thereto in a plane through the longitudinal axis of the shaft, and flat compression spring means extending between said spring supporting member and said wiper arm supporting member, said spring means having its inner end disposed in fixed relation to said spring supporting member and its outer end engaging said wiper arm supporting member, said spring ends being so positioned that, when said wiper arm supporting member is in operating position, a line drawn between its pivot and the point of engagement of the outer end of said spring with said wiper arm supporting member will pass on one side of the effective point of support of the inner end of said spring and, when said arm supporting member is in disengaged position, a line drawn between said pivot and the point of engagement of the outer end of said spring with the arm supporting member will pass on the other side of said effective point of support of the inner end of the spring, whereby a force tending to move said wiper arm supporting member toward the windshield will be normally exerted by the spring means and a force tending to move said wiper arm supporting member away from the windshield will be exerted after said end of said spring which engages said arm supporting member has been moved away from the windshield sufficiently to cause a line, extending between the pivot point of said arm supporting member on said spring supporting member and the point of engagement of said spring with said arm supporting member, to move across the point of engagement of said spring with said spring supporting member.

2. In a windshield cleaner or the like, a squeegee bar supporting arm, an operating shaft, means for pivotally securing said arm to said shaft for rotary movement therewith, said pivotal means being adapted to permit said arm to swing toward and away from the windshield, and spring means adapted to exert a compressive force between said shaft and said arm, said spring means having its inner end disposed in fixed relation to said shaft and said pivot and its outer end engaging said arm, said spring ends being so positioned that, when said arm is in operating position, a line drawn between said pivot and the point of engagement of the outer end of the spring with the arm will pass on one side of the effective point of support of the inner end of said spring and, when said arm is in disengaged position, a line drawn between said pivot and the point of engagement of the outer end of said spring with the arm will pass on the other side of said effective point of support of the inner end of the spring.

FREDERICK G. FOLBERTH.
WILLIAM M. FOLBERTH.